//..//

United States Patent [19]

Stauffer

[11] 4,341,237

[45] Jul. 27, 1982

[54] APPARATUS AND METHOD FOR REDUCING THE WASTE OF WELDING GAS

[75] Inventor: Howard V. Stauffer, Sioux City, Iowa

[73] Assignee: Valmont Industries, Inc., Valley, Nebr.

[21] Appl. No.: 209,536

[22] Filed: Nov. 24, 1980

Related U.S. Application Data

[63] Continuation-in-part of Ser. No. 130,706, Mar. 17, 1980, abandoned, which is a continuation-in-part of Ser. No. 909,448, May 25, 1978, abandoned.

[51] Int. Cl.³ .......................... F16K 1/00; F16K 37/00
[52] U.S. Cl. .................................. 137/382.5; 137/557; 137/883; 137/613
[58] Field of Search ............ 137/613, 551, 382, 382.5, 137/383, 557, 883; 266/48

[56] References Cited

U.S. PATENT DOCUMENTS

| | | | |
|---|---|---|---|
| 322,002 | 7/1885 | Phillips et al. | 137/613 |
| 1,574,522 | 2/1926 | Stone | 137/382 |
| 2,694,407 | 11/1954 | Jobson | 137/505.12 X |
| 3,321,173 | 5/1967 | Seyer | 137/505.22 |
| 3,885,590 | 5/1975 | Ford et al. | 137/613 |

FOREIGN PATENT DOCUMENTS

| | | | |
|---|---|---|---|
| 1067700 | 10/1959 | Fed. Rep. of Germany | 137/883 |
| 604650 | 7/1948 | United Kingdom | 266/48 |
| 297442 | 3/1971 | U.S.S.R. | |
| 667354 | 6/1979 | U.S.S.R. | |

OTHER PUBLICATIONS

The Welding Encyclopedia, L. B. Mackenzie, vol. 12, p. 471.

*Primary Examiner*—A. Michael Chambers
*Attorney, Agent, or Firm*—Rogers, Eilers & Howell

[57] ABSTRACT

An apparatus and method is described for reducing the amount of gas consumed during welding operations. A source of relatively high pressure inert gas is supplied to an individual welding station. At the station is a pressure regulator for substantially reducing the gas pressure and having an inlet in communication with the higher pressure gas supply and an outlet in communication with the inlet of a surge tank. The outlet of the surge tank is in communication with the welding apparatus. The volume of the surge tank is sufficient, and the apparatus functions, to supply a flow of gas, to the welding apparatus at the reduced pressure during transient when the welding apparatus is turned on, greater than that supplied during steady state conditions.

In one embodiment, the apparatus of the invention includes a pressure gauge, pressure regulator, and surge tank within a sealed housing with the face of the pressure gauge positioned at one side thereof and visible externally of the housing. Access to the regulator for adjustment thereof is limited by means of a locked cover which, when opened, allows adjustment of the regulator through an opening with a suitable tool.

11 Claims, 8 Drawing Figures

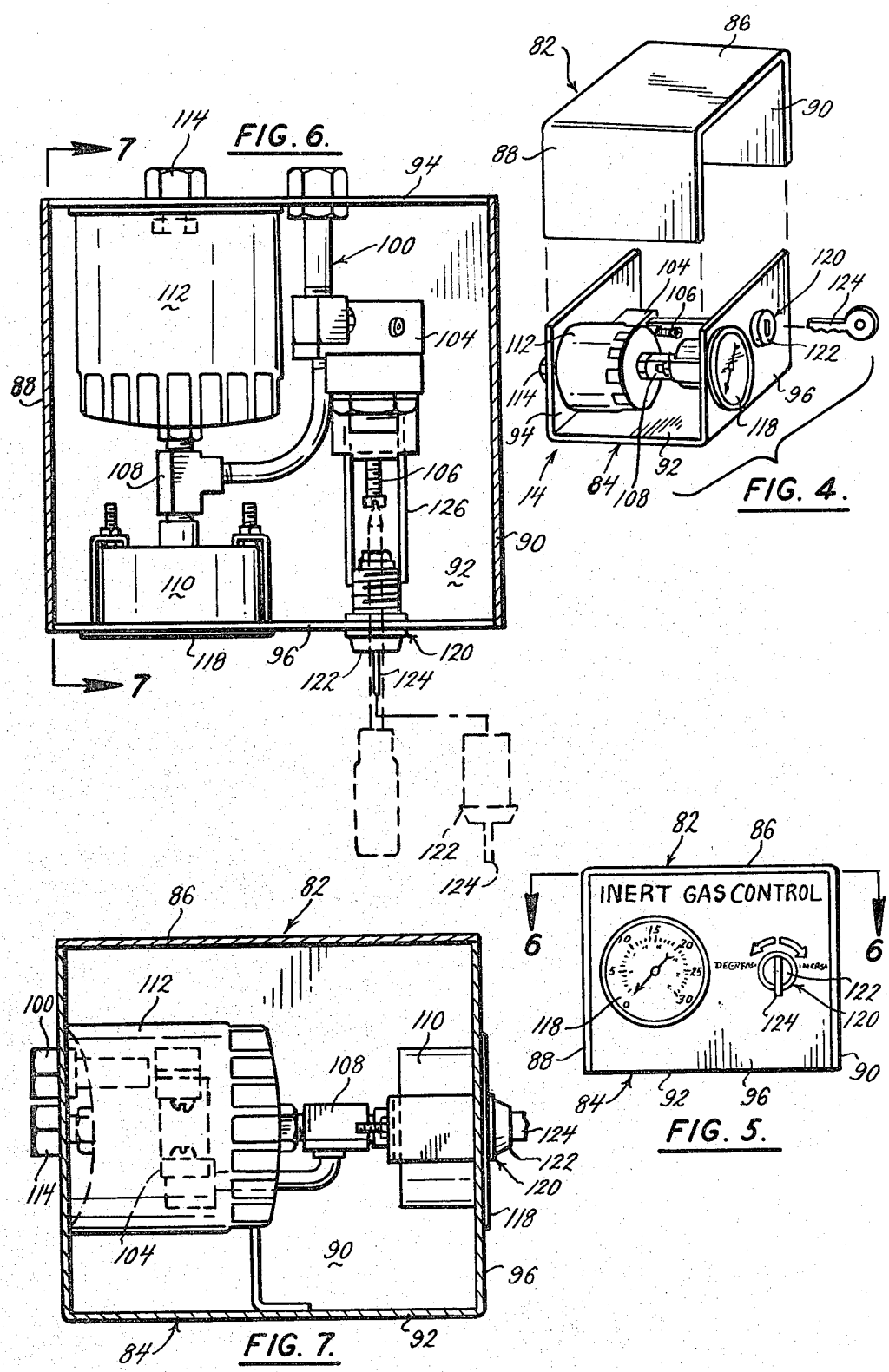

APPARATUS AND METHOD FOR REDUCING THE WASTE OF WELDING GAS

BACKGROUND OF THE INVENTION

This application is a continuation-in-part of application Ser. No. 130,706, filed Mar. 17, 1980, now abandoned, which is a continuation-in-part of application Ser. No. 909,448, filed May 25, 1978, now abandoned.

The present invention relates to a method and apparatus primarily for welding, and more particularly for reducing the amount of inert gas consumed during welding operations. The welding system (for example, an M.I.G. or T.I.G. type) may comprise a single welding station with its own supply of welding gas, or a plurality of welding stations all receiving gas from the same remote source of higher pressure gas as used in relatively large welding shops. In the remote system, a main gas line or header extends from the gas source to the various welding stations where drop lines extend therefrom to the actual welding apparatus. The present invention is applicable to both types of welding systems.

In both systems, the gas is stored at relatively high pressure, and typically there has been included a pressure regulator in the output line from the storage so that gas at a regulated pressure can be supplied to the one or more stations.

Heretofore, it has been customary, and even necessary, that the pressure of the welding gas downstream of the regulator be relatively high so that sufficient gas is available at all welding stations. For example, such pressure might be approximately 45 psi (3.163 kg/cm$^2$). This high pressure presents a problem. With such high static pressure, when the actuator or trigger of the gas nozzle is initially depressed, a large flow of gas is exhausted from the nozzle due to the build up of the high static pressure within the line. The amount of gas exhausted is far greater than the amount needed under transient welding conditions.

Nor is the problem solved by simply adjusting the pressure regulator so as to lower the pressure, or, in the case of a remote system, by simply installing a second pressure regulator in each drop line to reduce the pressure in that line. There is a limitation on how much the pressure may be reduced and still supply a sufficient flow of gas to the welding apparatus to perform the necessary welding operations both under transient and steady state conditions. Thus, if the pressure is reduced by adjusting the pressure regulator so that exactly the optimum flow of gas is supplied during steady state welding conditions, there will be an insufficient flow under the transient conditions. Moreover, if the gas pressure is reduced by the pressure regulator to supply the optimum flow of gas under transient conditions, there will be an excess, or waste, of gas during steady state conditions.

Therefore, it is a principle object of this invention to provide an improved method and apparatus for substantially reducing the waste of welding gas, and which provides a means by which the gas supplied to each welding apparatus (gas nozzle) may be separately controlled to provide nearly optimum flows of gas at the nozzle to meet both transient and steady state requirements, and minimize gas waste.

In accordance with the invention, a pressure regulator, which is separate from and in addition to the regulator typically used in welding systems, is provided in combination with a surge tank in the gas line at each welding station to substantially reduce the pressure in the line. In the case of a remote installation, there is a pressure regulator and surge tank in each drop line. The surge tank is located at the output of the pressure regulator such that the outlet of the pressure regulator is in communication with the inlet of the surge tank. The outlet of the surge tank is in communication with the welding apparatus.

The purpose of the surge tank is to provide a low pressure gas reservoir between the regulator and welding apparatus. The surge tank functions to provide a flow of gas during the transient period which is greater than that supplied to the welding apparatus during steady state operation. Thus, the tank acts to supply a "surge" of gas when the welding operation begins.

The objective is to efficiently, without waste, meet the gas requirements under both transient and steady state conditions. Thus, with the low pressure set to supply the proper flow of gas under steady state conditions, the volume of the surge tank should be such that the amount of gas contained therein under low pressure static conditions will be sufficient to supply the proper flow of gas during the transient period.

The result is a significant reduction of waste and a correspondingly significant savings in dollars.

In a preferred embodiment of the invention, the components of the apparatus, such as the pressure gauge, pressure regulator, and surge tank, are positioned within a sealed housing to prevent tampering. This will ensure that the apparatus, once adjusted to function in the most efficient manner, will remain that way, and will not be subject to tampering by the welding operators. Thus, it is another primary object of the invention to provide an apparatus that is economical in manufacture and durable in use, which is easy to adjust for optimum efficiency of each welding station, and yet is readily sealed to prevent tampering with the components thereof once the adjustment has been made.

In accordance with this preferred embodiment, the pressure gauge is visible from one side of the housing. A key operated lock selectively closes an opening in one side of the housing so that the pressure regulator can only be adjusted when the lock has been removed from the housing thereby exposing a pressure adjustment screw of the regulator.

BRIEF DESCRIPTION OF THE DRAWINGS

FIG. 4 is a perspective view of the apparatus of another embodiment of this invention having a portion of the housing removed to more fully illustrate the invention;

FIG. 5 is a front view of the apparatus of FIG. 4;

FIG. 6 is a sectional view of the apparatus as seen on lines 6—6 of FIG. 5 with the broken lines illustrating the lock having been removed therefrom;

FIG. 7 is a sectional view seen on lines 7—7 of FIG. 6; and

DESCRIPTION OF PREFERRED EMBODIMENTS

Figure 1:
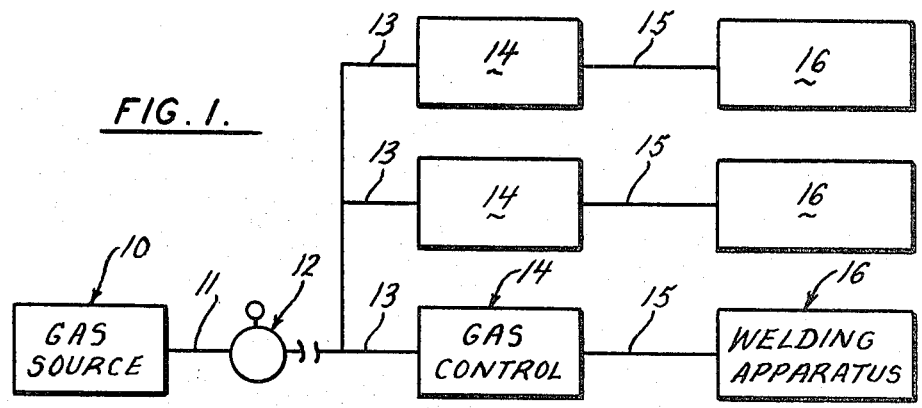
FIG. 1 is a schematic view of a typical welding shop layout.
Figure 2:
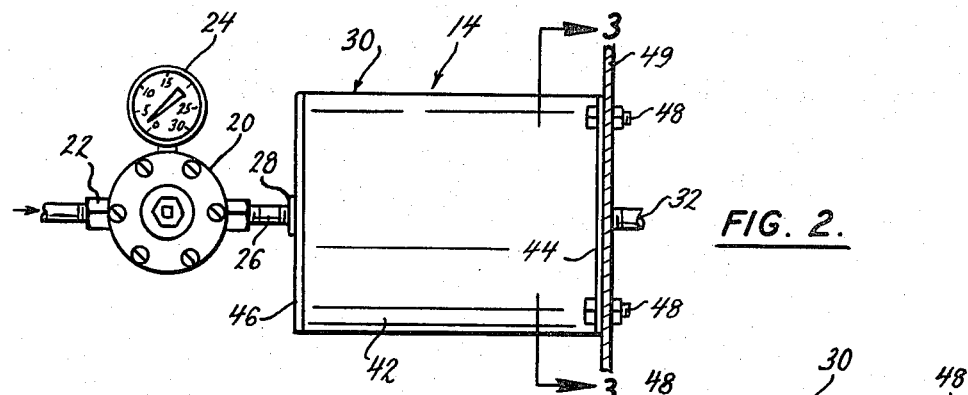
FIG. 2 is a side view of one form of the invention.
Figure 3:
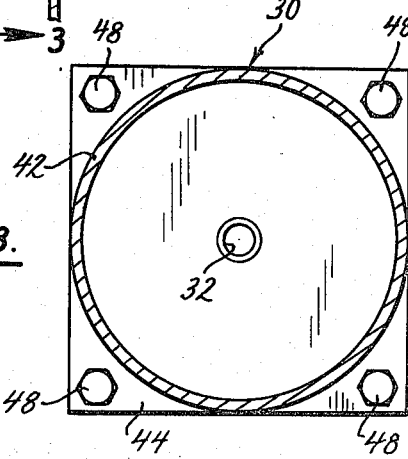
FIG. 3 is a sectional view as seen on lines 3—3 of FIG. 2.

Referring to FIGS. 1-3, showing the first described embodiment, the numeral 10 designates the source of high pressure welding gas connected through a gas line 11 to a main pressure regulator 12 typically included in conventional welding systems. The outlet of the pressure regulator 12 is connected through drop or branch lines 13 to gas controls 14 which are the subject of the present invention. The outlet of each gas control 14 is connected through a line 15 to a welding apparatus 16 of a typical welding station. Examples of welding systems to which this invention relates are metal inert gas (M.I.G.) and tungsten inert gas (T.I.G.) welding systems, each of which contain a shutoff valve to prevent gas flow when no welding is in progress.

An embodiment of the gas control 14 of the present invention is shown in FIGS. 2 and 3. The numeral 20 refers to an adjustable pressure regulator having its inlet 22 in communication with the gas line 13. The numeral 24 refers to a pressure gauge in communication with the outlet of the pressure regulator. The outlet 26 of the pressure regulator is in communication with the inlet 28 of a cylindrical surge tank 30. The outlet 32 of surge tank 30 is in communication with the welding apparatus 16 by line 15.

Regulator 20 is adjustable as previously described and is preferably adjustable from 0 to 30 psi (0 to 2.109 kg/cm$^2$) outlet pressure while gauge 24 is preferably of the 0 to 30 psi (0 to 2.109 kg/cm$^2$) type. The surge tank 30 has end plates 44 and 46, one of which is provided with bolt openings formed therein adapted to receive bolts 48 to enable the tank 30 to be mounted on a supporting structure 49 as seen in FIG. 2.

With reference to the embodiment of FIGS. 4 through 7, the control apparatus 14 of this preferred embodiment generally comprises a housing formed from housing members 82 and 84 which are welded together.

Housing member 82 includes a top 86 and sides 88 and 90 which extend downwardly therefrom. Housing member 84 includes a bottom 92 having back and front walls 94 and 96 extending upwardly therefrom.

Fitting 100 is positioned at the back portion of the apparatus and is placed in communication with the line 13. The fitting 100 is connected to the inlet of an adjustable pressure regulator 104 including an adjustment screw 106. The pressure regulator 104 delivers outlet pressure of between approximately 0 to 15 psi (0 to 1.05 kg/cm$^2$) with inlet pressure of less than 350 psi (0 to 24.5 kg/cm$^2$), and maintains said low outlet pressure consistantly over a period of time consistant with welding requirements. The outlet of pressure regulator 104 is in communication with a T-fitting 108 which is in communication with a pressure gauge 110 and the inlet of surge tank 112. The gauge may be similar to the gauge 24 of the first described embodiment. Fitting 114 is in communication with the discharge outlet side of the surge tank 112 and is placed in communication with line 15 extending to the wire feeder or welding apparatus 16.

As best seen in FIG. 5, the face 118 of the pressure gauge 110 is externally visible at the front of the housing. A key-operated lock 120 is mounted in the front of the housing and includes a barrel 122 which is removable therefrom when the key 124 is utilized. Support 126 extends from the lock 120 to the pressure regulator 104 as best illustrated in FIG. 6. Thus, with the barrel 122 in place in the lock 120 and the key 124 removed therefrom, access to the pressure adjustment screw 106 is prevented. However, when the barrel 122 is removed from the lock 120, the pressure adjustment screw 106 may be rotated by simply inserting a screwdriver through an opening in the lock 120 as seen in FIG. 6.

Thus, the embodiment of FIGS. 4 through 7 provides a self-contained, sealed, unit for the apparatus of this invention, which is relatively inexpensive, yet durable, and which prevents tampering with the unit components, while allowing ready adjustment by authorized personnel. The unit also provides ready connection in the gas line at each welding station.

THEORY OF OPERATION

While applicant need not explain, or even know, the theory of operation of his invention, it being sufficient that the apparatus and method of the invention solve the problem and achieve the results intended, the theory of operation is believed to be as follows:

The flow of gas required under the transient conditions (when the welding apparatus is first turned on, as when the gas nozzle trigger is depressed) is greater than the flow of gas needed during steady state conditions (continued welding after transient). It is believed that the reason for requiring this additional flow of gas during transient conditions is that when the welding apparatus is off, air leaks back through the nozzle and partly into the gas line. This air must be quickly purged and replaced with the inert gas to produce a high quality weld. Also, it is critical to displace the air at the weld zone of the work piece upon initiating the weld.

Figure 8:
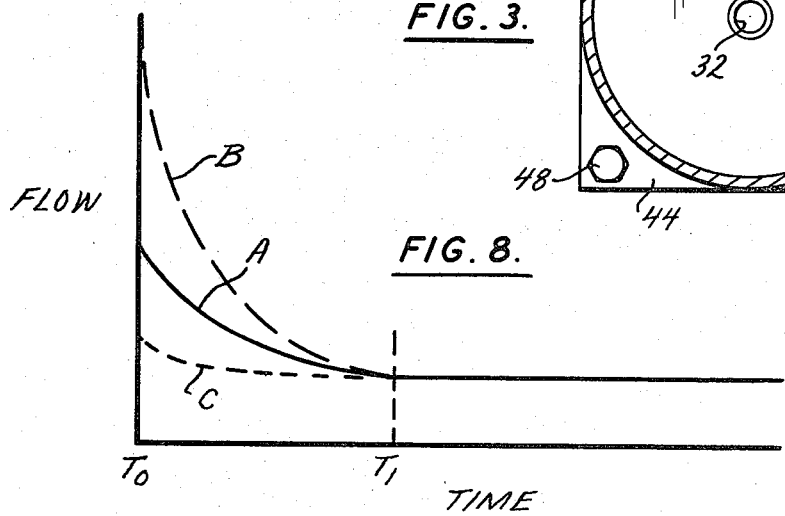
FIG. 8 shows a gas flow curve from initial to steady state conditions approximating optimum flow requirements for efficient operation.

Curve A of FIG. 8 illustrates optimum gas flow from the welding apparatus over time. The time period between zero and $T_1$ is the transient period. The time period after $T_1$ is the steady state period. As shown by curve A, the flow of gas required for proper welding during transient conditions is higher than during steady state conditions.

As a comparison to curve A, curve B illustrates the gas flow from a welding apparatus of a conventional welding system without the control of the present invention, and curve C illustrates the gas flow from a welding apparatus of a welding system which would include only a regulator with no surge tank. These curves illustrate that with the conventional system there is considerable gas waste during the transient period as shown by curve B, while by using only a regulator without a surge tank, the gas flow during transient is insufficient as shown by curve C.

As previously explained, the primary object of this invention is to provide sufficient gas flow from initial conditions ($T_0$) through steady state, without wasting gas. In other words, the primary object of the invention is to approximate curve A as closely as possible. This invention fulfills this object.

Because any temperature change in the gas during transient flow is negligible and can be ignored for the purpose of this analysis, therefore ignoring temperature, Boyle's Law states:

$$V_1 P_1 = V_2 P_2; \text{ or } V_2 = (P_1 V_1)/(P_2),$$

where $P_1$ and $P_2$ are absolute pressures, where $V_1$ is the volume of the gas in the surge tank at static pressure; $P_1$ is the static pressure in the surge tank at $T_0$; $P_2$ is the pressure in the surge tank at $T_1$; and $V_2$ is the effective volume of the gas in the surge tank brought about by the change in pressure from $P_1$ to $P_2$. In other words, as the pressure drops from $P_1$ to $P_2$, the effective volume of the gas in the surge tank increases. Or, to put it another way, the actual quantity (weight) of gas in the surge tank decreases during the transient period. This change in quantity, which can be represented as $V_2-V_1$ or $\Delta V$, becomes the surge or additional flow of gas required for proper welding during transient conditions as indicated in FIG. 8, curve A from $T_0$ to $T_1$.

Once steady state conditions are reached, there is no appreciable pressure drop across the surge tank so that $P_1$ is equal to $P_2$ and $V_1$ is equal to $V_2$. In other words, the surge or increased flow of gas is supplied only during transient so that there is no excessive gas loss during steady state welding. The volume of the surge tank, and the pressure of the gas within it under static conditions, are selected to provide a flow of gas that will closely approximate the transient and steady state condition requirements. Thus, the surge tank should be of a sufficiently large volume to supply adequate gas without excessive waste during transient conditions, and at a sufficiently low static pressure to minimize gas waste during steady state conditions.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. A method of controlling the gas in a gas welding system having at least one welding station, each station having a welding apparatus connected through a branch gas line and a main line to a source of high pressure welding gas, there being as many branch lines as there are welding stations in the system with each branch line having only one welding station connected therein, said method comprising the steps of:
   in each branch line, substantially reducing the pressure of the gas delivered from the source to the welding apparatus;
   allowing the gas in each branch line to expand to a reduced static pressure into a surge tank located in the branch line upstream of the welding apparatus, and
   delivering the gas from the surge tank to the welding apparatus in the same branch line with said surge tank when the welding apparatus is operated,
   whereby the flow of gas delivered to the welding apparatus is greater during the transient period immediately upon operating the welding apparatus, than during steady state operating conditions.

2. A gas delivery apparatus comprising,
   a source of high pressure gas,
   a main gas line for delivering gas from said source,
   at least one gas consuming stations,
   for each station a branch gas line for delivering gas from said main line to said station, there being as many branch lines as there are stations in the system with each branch line having only one station connected therein, and
   a control in each of said branch lines, said control further comprising,
      a pressure regulator connected in the branch line for substantially reducing the pressure of the gas at the output of the regulator, and
      a surge tank means in fluid communication with the output of the pressure regulator and an with said only one station,
   whereby the flow of gas delivered from said control to said station at said reduced pressure is greater during the transient period immediately upon operating the station, than during steady state operating conditions.

3. The system of claim 2 wherein said control further comprises:
   a housing, said pressure regulator being mounted within said housing;
   and means providing selective access to said regulator for adjustment thereof to prevent unauthorized tampering with said regulator.

4. The system of claim 3 wherein said surge tank is located within said housing.

5. The system of claim 4 wherein said selective access means is a key operated closure.

6. The system of claim 4 wherein said selective access means further comprises a closure operable between a locked/closed position and an open position to provide an opening in the housing with the closure in the open position, said opening allowing insertion therethrough of an adjusting tool for adjusting said regulator.

7. The system of claim 4 further comprising a pressure gauge in fluid communication with said regulator output.

8. The system of claim 7 wherein said gauge is mounted within said housing for reading exteriorly of said housing with said housing closed.

9. The system of claim 8 wherein said gauge is mounted in a wall of said housing with its face exteriorly exposed for ready reading.

10. The system of claim 2 wherein said gas is inert and said gas consuming stations are welding stations.

11. A gas delivery system comprising,
    a source of high pressure gas,
    a main gas line for delivering gas from said source,
    at least one gas consuming station,
    for each station a branch gas line for delivering gas from said main line to said station, there being as many branch lines as there are stations in the system with each branch line having only one station connected therein, and
    a control in each of said branch lines, said control further comprising,
       a housing having control inlet and outlet connections for fluid communication in a branch gas line, said control outlet connection for fluid communication with said only one station,
       a pressure regulator within said housing, said regulator having an inlet and an outlet, said inlet being in fluid communication with said control inlet,
       a surge tank within said housing, said surge tank being in fluid communication with said regulator outlet and said control outlet,
       a pressure gauge within said housing in fluid communication with said regulator outlet, said gauge being mounted for reading from exteriorly of said housing with the housing closed, and
    means providing selective access to said regulator for adjustment thereof to prevent unauthorized tampering therewith, said selective access means further comprising a closure operable between a locked/closed position and an open position and providing an opening in said housing with the closure in the open position for insertion of an adjusting tool therethrough for adjusting said regulator,
    whereby the flow of gas delivered from said control to said station at said reduced pressure is greater during the transient period immediately upon operating the station, than during steady state operating conditions.

* * * * *